April 1, 1930.  E. S. HUTTON  1,752,435
BACKING STOP FOR VEHICLES
Filed March 11, 1929
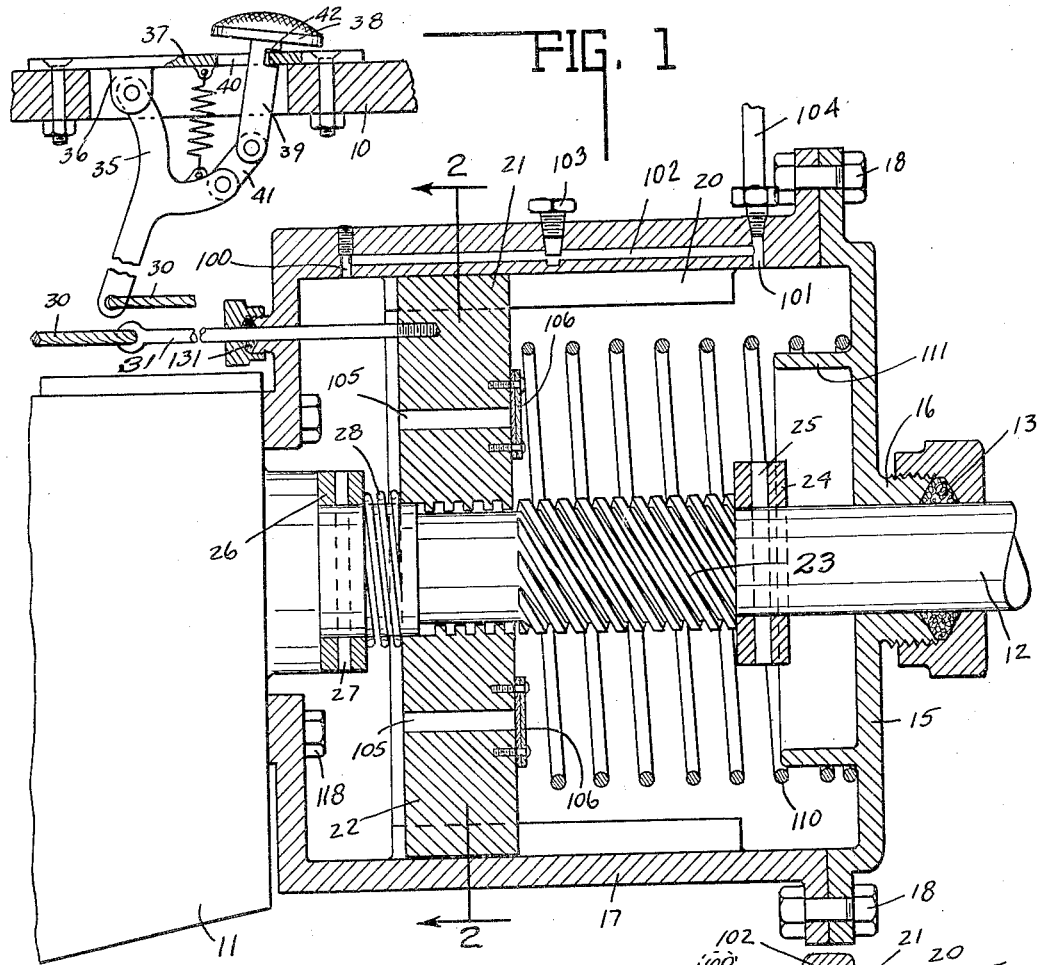
INVENTOR.
EDWARD S. HUTTON.
BY
ATTORNEYS.

Patented Apr. 1, 1930

1,752,435

UNITED STATES PATENT OFFICE

EDWARD S. HUTTON, OF MIAMI, FLORIDA

BACKING STOP FOR VEHICLES

Application filed March 11, 1929. Serial No. 346,175.

This invention relates to a safety device for preventing accidental backing or rearward movement of automobiles.

This invention is an improvement upon and a continuation in part of a similarly titled and copending application which bears Serial No. 324,528, filed December 7, 1928.

The chief object of this invention is to check or stop the rearward movement of an automobile, as when it starts to back down hill, and to gradually apply the stopping pressure thereto and which does not interfere with the forward movement or driving of the automobile. It is, therefore, a vitally important safety device for automobiles, as it eliminates automatically all danger of the automobile backing, particularly while climbing hills or mountains, and causing the automobile to be capsized or wrecked. If the engine dies or for any reason the automobile starts backward when it is not desired, this invention will check and stop the backward movement and hold the car until the engine can resume its pull and the automobile advance, and the backing stop will not interfere with the advancing movement of the car.

One feature of the invention consists of a threaded sleeve or portion secured on the drive shaft of the automobile with stop collars fixedly secured to the driving shaft and a threaded nut adapted to mesh with and travel on said threaded portion of the drive shaft, preferably backward, which is slidably mounted in the stationary housing surrounding the drive shaft so that when the drive shaft moves the nut will travel and be moved thereon until it is stopped by one of the stop collars which will immediately stop the backward rotation of the drive shaft because of the inability of the nut to rotate in its locked position on the shaft.

Another feature of the invention consists in arranging the parts thereof such that a cushion or checking action is obtained.

An additional feature of this invention consists in means for normally holding the nut out of engagement with the threads on the drive shaft and against a compressed spring on the shaft so that when said means is released, the spring will throw the nut into engagement with the threads of the drive shaft and enable it to operate and stop the backward movement of the drive shaft.

The full nature of the invention will be more fully understood from the accompanying drawings and the following description and claims:

In the drawings Fig. 1 is a central longitudinal section of parts of an automobile including the drive shaft and the backing stop mechanism constituting this invention in non-stopping position, a portion of the figure being offset from the remainder. Fig. 2 is a central vertical cross section on line 2—2 of Fig. 1. Fig. 3 is a reproduction of the central portion of Fig. 1 showing the backing stop in a second and vehicle-stopping position.

In Fig. 1 there is illustrated the floor board 10 of an automobile at a higher level than the transmission case 11 and the driving shaft 12 all arranged in the usual way as is customary in automobile construction.

This invention adds to the foregoing common mechanism the means to stop the backing of an automobile. To that end the plate 15, which may be stationarily mounted, has an integral bearing 16 for the drive shaft. A gland or packing construction 13 seals the shaft 12 therein. A cylindrical housing 17 surrounds the drive shaft and at one end is secured by bolts 18 to the plate 15. The bolts 118 secure the opposite end of the housing to the transmission case 11 so that the housing is very rigid and, as shown herein, said housing forms a complete closure except that a pair of ducts 100 and 101 communicate with the chamber adjacent each end and communicate with each other by a cross passage 102. A valve member 103 is associated with said passage and controls the rate of flow therethrough. A supply line 104 may be suitably associated with any device for filling the housing, such as a pressure oil pump or the like.

The housing 17 is provided internally with longitudinal grooves 20 adapted to receive the splines 21 on the nut 22 loosely as shown in Figs. 1 and 3. The nut 22 is internally threaded and surrounds normally an unthreaded portion of the drive shaft 12. The drive shaft within said housing 17 is for a portion of its length provided with screw threads 23 that extend rearward. At the rear end of said threads there is a stop collar 24 rigidly secured on the drive shaft by a pin 25.

There is another collar 26 secured by pin 27 on the drive shaft forward of the nut 22, as appears in Fig. 1. Between the nut 22 and said front collar there is a spiral spring 28 surrounding the drive shaft and normally under compression by the nut 22. This compression of the spring 28 is caused by pulling forward the cord 30 that is secured to an eye of the rod 31 screwed to the nut 22, so as to move the nut 22 forward on the drive shaft out of engagement with the threads 23 thereon, and releasable means is provided for holding the cord 30 in its taut condition normally. The packing 131 seals the opening through which the rod 31 slidably operates.

The operation is a very simple one,—if it is desired to check the backward movement of the automobile, the cord 30 is released, whereupon the spring 28 expands and throws the nut 22 rearward into engagement with the threads 23 of the drive shaft. Slight further rearward movement of the car and drive shaft causes the nut 22 to screw rearward until it is stopped by the stop collar 24. Then the drive shaft is stopped from further backward rotation because it is interlocked with the stationary housing 17 through the intermediate nut 22. This will hold the car from backward movement, and yet leave free one's feet and hands for starting the car forward, and the backing stop means will not interfere with the forward advancing movement of the car at any time. If one is on a steep hill, such backing stop will hold the car during abortive efforts to start the engine or drive the car forward.

When the car is driven forward, the stop nut 22 will move forward because of the threads 23 on the drive shaft until it is disengaged therefrom, and then the cord 30 is pulled forward sufficient to move and hold the nut 22 out of engagement with the threads on the drive shaft and at the same time compress the spring 28.

The means for providing the drive shaft with the threaded section 23 may be such as desired. Here the threads 23 are integral with the shaft, but that is not necessary so long as they are rigidly secured on the shaft 12 as by means of a threaded sleeve secured to the shaft or otherwise. Likewise, the means for operating the cord 30 may be such as is desired.

There is shown herein a bell crank lever 35 for pulling the cord 30 and holding it in such position. Said lever 35 is fulcrumed to an ear 36 on the underside of the plate 37 on the floor 10 of the automobile. A pedal 38 located above the floor has a shank 39 extending downward through a slot 40 in said plate 37, which shank is pivotally connected with one arm of the bell crank lever 35, preferably through the link 41. The pedal shank 39 has a notch 42 which engages the plate 37 at the rear of the slot 40 and locks the pedal 38 downward when pushed by the foot and thus holds the cord 30 and the nut 22 in their forward and normal positions.

If the automobile starts backing when not desired, pedal 38 is pushed forward and disengaged, which will release the spring 28 and that will draw the cord 30 rearward and also force the nut 22 into engagement with the threads 23 on the drive shaft. The invention, however, is not limited to this particular pedal means for releasing the nut 22.

The nut 22 in effect constitutes a piston and includes a plurality of passages 105, each of which is associated with a flap valve 106 that is normally sealed in the movement of the nut from left to right, or in threading upon the shaft. The oil or relatively incompressible liquid with which the housing is filled escapes through the duct 101, cross passage 102 and is discharged into the chamber through duct 100 on the opposite side of the piston. The cushion effect can be adjusted by regulating the flow through the passage 102 by the valve 103. Upon reverse or releasing movement, the liquid does not return through the cross passage 102 but pushes through the relatively large piston passages 105 so that little fluid resistance is offered in the return movement of the piston. The cushioning takes place in the stopping application or operation.

To further assist in returning the piston and to oppose the application of the stopping action, a coil spring 110 is provided, one end of which bears on the piston and the opposite end on the housing plate.

The invention claimed is:

1. Means for stopping the backward movement of a motor vehicle having a drive shaft, including a threaded portion on the drive shaft, a fluid-tight housing surrounding the same, a nut associated with the housing and the threaded portion of the shaft and constituting a piston in said housing, and yielding means interposed between the housing and the nut normally resisting threading movement between the nut and shaft.

2. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, and a restricted outlet from the chamber whereby chamber fluid opposes threading movement between the nut and the shaft.

3. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, a restricted outlet from the chamber whereby chamber fluid opposes threading movement between the nut and the shaft, an intake to the chamber upon the opposite side of the piston, said intake and outlet communicating, and a check valve construction also therebetween operable upon reverse movement between the nut and shaft.

4. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, an outlet from the chamber whereby chamber fluid opposes threading movement between the nut and the shaft, an intake to the chamber upon the opposite side of the piston, said intake and outlet communicating, a check valve construction also therebetween operable upon reverse movement between the nut and shaft, and a valve controlling the first mentioned communication between the intake and outlet for regulating the fluid opposition.

5. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, a restricted outlet from the chamber whereby chamber fluid opposes threading movement between the nut and the shaft, and yielding means interposed between the housing and nut normally resisting threading movement between the nut and shaft.

6. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, a restricted outlet from the chamber whereby chamber fluid opposes threading movement between the nut and the shaft, an intake to the chamber upon the opposite side of the piston, said intake and outlet communicating, a check valve construction also therebetween operable upon reverse movement between the nut and shaft, and yielding means interposed between the housing and nut normally resisting threading movement between the nut and shaft.

7. Means for stopping the backward movement of a motor vehicle having a drive shaft, including a threaded portion on the drive shaft, a fluid-tight housing surrounding the same and forming a chamber, a nut associated with the housing and the threaded portion of the shaft and constituting a piston in said chamber, an outlet from the chamber whereby chamber fluid opposes threading movement between the nut and the shaft, an intake to the chamber upon the opposite side of the piston, said intake and outlet communicating, a check valve construction operable upon reverse movement between the nut and shaft, a valve controlling the first mentioned communication between the intake and outlet for regulating the fluid opposition, and yielding means interposed between the housing and nut normally resisting threading movement between the nut and shaft.

In witness whereof, I have hereunto affixed my signature.

EDWARD S. HUTTON.